(12) United States Patent
Renirie et al.

(10) Patent No.: US 8,328,989 B2
(45) Date of Patent: Dec. 11, 2012

(54) FLOUR-BASED PRODUCT, ITS PREPARATION AND USE

(75) Inventors: Jacobus Gerardus Renirie, Steenbergen (NL); Jacobus Adrianus Antonius Van Der Meijden, Voorburg (NL); Johannes Jozef Plijter, Elst (NL); Jeroen Johannes Van Soest, Beek, Gem. Montferland (NL)

(73) Assignee: Stichting Kennis Exploitatie RB, Oosterhout (NL)

( * ) Notice: Subject to any disclaimer, the term of this patent is extended or adjusted under 35 U.S.C. 154(b) by 478 days.

(21) Appl. No.: 12/517,948

(22) PCT Filed: Nov. 26, 2007

(86) PCT No.: PCT/NL2007/050594
§ 371 (c)(1),
(2), (4) Date: Jun. 5, 2009

(87) PCT Pub. No.: WO2008/069655
PCT Pub. Date: Jun. 12, 2008

(65) Prior Publication Data
US 2010/0314057 A1    Dec. 16, 2010

(30) Foreign Application Priority Data
Dec. 5, 2006  (EP) ..................................... 06125430

(51) Int. Cl.
*D21H 17/28* (2006.01)
*D21H 17/22* (2006.01)
(52) U.S. Cl. ....................................... 162/175; 162/174
(58) Field of Classification Search .................. 162/175; 106/125.1; 127/34, 36, 67, 69, 70, 71; 435/68.1, 435/99, 101; 536/102
See application file for complete search history.

(56) References Cited

U.S. PATENT DOCUMENTS

| | | | |
|---|---|---|---|
| 3,859,108 A | 1/1975 | Ware et al. | |
| 4,392,896 A * | 7/1983 | Sakakibara | ...................... 156/39 |
| 4,619,772 A | 10/1986 | Black et al. | |
| 4,650,593 A | 3/1987 | Slingerland | |
| 4,652,384 A | 3/1987 | Francis et al. | |
| 5,489,440 A | 2/1996 | Ndife et al. | |
| 6,022,450 A * | 2/2000 | Van Kessel et al. | .......... 162/174 |
| 2004/0261659 A1 | 12/2004 | Neale et al. | |

FOREIGN PATENT DOCUMENTS

| | | |
|---|---|---|
| JP | 5-137545 | 6/1993 |
| JP | 9-132533 | 5/1997 |
| JP | 11-332452 | 12/1999 |
| WO | 91/05908 | 5/1991 |
| WO | 97/10385 | 3/1997 |
| WO | 97/38164 | 10/1997 |
| WO | 2004/084639 | 10/2004 |

OTHER PUBLICATIONS

Smook, Handbook for Pulp and Paper Technologists, 1992, Angus Wilde Publications, 2nd edition, chapter 18.*
International Search Report dated Apr. 8, 2008, from corresponding PCT application.

* cited by examiner

*Primary Examiner* — Anthony Calandra
(74) *Attorney, Agent, or Firm* — Young & Thompson

(57) ABSTRACT

The invention pertains to a process for manufacturing paper or cardboard, wherein flour including a protein and starch fraction is subjected to a degradation step involving a treatment with protease and a non-starch polysaccharide (NSP) hydrolyzing enzyme, after which the flour is introduced into the paper fiber matrix. It is especially preferred that the flour is rye flour, and that the NSP hydrolyzing enzyme is a hemicellulase or a cellulase, or a combination thereof. The invention also pertains to a composition containing flour and the aforementioned enzymes; and to the use of flour thus treated as a source of starch.

22 Claims, No Drawings

US 8,328,989 B2

FLOUR-BASED PRODUCT, ITS PREPARATION AND USE

FIELD OF THE INVENTION

The invention relates to a process of making a flour, with enhanced functionality, suitable for industrial non-food applications requiring starch, such as fibreboard, paper, glue, adhesive, oil drilling, mining, textile, paint, ink and coating, detergent, bioplastic, building and construction. The invention is particularly in the field of paper sizing. The invention also pertains to a method for incorporating flour in cellulose fibre matrices, such as a paper-fibre matrix, in the manufacture of paper and cardboard, fibreboard, and textile, tissues and non-wovens.

BACKGROUND OF THE INVENTION

In many applications, highly purified starches have to be used. Protein-, fibre- and/or lipid-containing materials, such as cereals, flours and processing side-products can not be used because of the contaminating effects or deteriorating functionality of products made thereof, as a result of the non-starch components. Examples can be found in industrial non-food applications like paper, textile, adhesive, water purification, mining and oil drilling, and various more.

In paper and cardboard industry, traditionally, starches are used as a fibre-reinforcing component on a large scale and in large volumes. In particular, these starches are introduced into the paper fibre mass by means of a so-called size press. Similar applications are found in related fields such as that of the manufacture of textiles, non-wovens, tissues, and fibreboard.

U.S. Pat. No. 3,859,108 describes the use of flour in sizing paper and cardboard. Up to then, it was the general belief that proteins, such as the gluten present in flour, had a contaminating effect and caused lump formation and depositions in the system. Hence, the gluten in flour was first washed from the flour. On the contrary, U.S. Pat. No. 3,859,108 teaches that the proteins rather have a positive effect and can even take over the function of a part of the conventionally required starch. The economically unprofitable drying and purifying steps can thus be dispensed with. Thereto, the protein fraction of the flour should be maintained in substantially non-degraded form, i.e. retaining the physical properties of soluble proteins in solution. The starch is degraded enzymatically, e.g. using α-amylase, or chemically, using $H_2O_2$, so as to reduce the viscosity of the flour paste, after which the flour is cooked conventionally.

WO-A-97/10385 also relates to a method for manufacturing paper or cardboard incorporating treated flour. The flour, chemically unmodified, is subjected to a treatment whereby starch and protein are solubilized, after which the treated components of the flour are introduced into the paper-fibre matrix in a joint step. The flour treatment should not only include the aforementioned one-step treatment as known for native starch, but also a second treatment of a deamidation reaction and/or a partial proteolysis (e.g. using neutrase) to render the gluten more water-soluble. According to the examples, it would require an acid ammonium persulfate (APS) treatment at boiling temperature, or an APS and protease treatment, or an α-amylase and protease treatment. The flour may be one of beans, peas and grains, for example wheat corn and rice grains. The preferred and exemplified embodiment encompasses chemically unmodified wheat flour.

WO-A-97/38164 attempts to improve the drainage of recycled paper pulp by adding a starch hydrolysing enzyme, preferably an amylase, prior to the separation of the water from the pulp. However, drainage of pulp has little to do with the process of adding starch to the paper-fiber matrix, and the problems that arise in that step if a source of starch high in protein content is applied.

However, it is the inventors' findings and experience that the previously described methods make use of protein-starch mixtures and that the aforementioned methods still lead to protein, NSP and-/or fibre sludge and scum build-up in (paper or card-board) production equipment over time, which has precluded the economic use of flour-based instead of starch-based sizes up to present. Evidence thereof is presented in the accompanying examples.

US-A-2004/0261659 addresses the need to improve the strength of paper provided in WO-A-97/10385. It teaches to treat a starch and protein containing mixture, such as flour, using alkali oxidation. Thus obtained are improved compositions for coating paper stock. It is silent on the process of incorporating flour in the paper-fibre matrix, and on the drawback of protein accumulation in such a process.

Similar problems related with the forming of deposits and protein lumping arise in other industrial non-food applications: Starches are used in (highly) purified form in various non-food applications because the presence of protein or NSP in products are deteriorating functionality in applications and products. Some of these non-paper applications are described in more detail below.

Many publications refer to the use of (modified) starches in aqueous fluids used for drilling of oil, gas and geothermal wells. See for example U.S. Pat. Nos. 4,652,384 and 4,650,593, in the field of well-drilling fluids. The starches are used to improve various qualities of such fluids, most specifically to control filtrate or fluid losses, while having a minimum impact on viscosity. Other application areas of starches are well-fracturing fluids. It is often reported that starch polymer or cellulosic or biopolymer that has a significant contribution to the viscosity build of a drilling fluid, is undesired. There is a special role for proteins therein. U.S. Pat. No. 4,619,772 teaches that a high protein content improves viscosity and filtration control characteristics in high temperature and pressure conditions, e.g. in oil well applications. However, the product is difficult to disperse at RT because of lumping.

SUMMARY OF THE INVENTION

In a primary aspect the invention pertains to a method for providing a well accessible source of starch in general, and to a method for incorporating flour in paper sizing more in particular, which is not hampered by the aforementioned disadvantages. It is also an object to provide paper or cardboard which has substantially the same properties as their conventional counterparts containing similar amounts of starch, but which have been prepared using starch only.

It is found that the aforementioned objects are achieved by treating the flour components with a protein hydrolysing enzyme, such as protease, and a non-starch polysaccharide (NSP) hydrolysing enzyme, such as xylanase and cellulase So far, xylanase has only proven useful in biobleaching lignocellulosic pulp, where it is used in combination with oxygen bleaching to reduce organo-chlorine pollutants from the paper making process (see e.g. WO-A-91/05908). It is now observed that xylanase may also be used to treat flour suitable as a strengthening additive in paper manufacture, prior to introducing the flour to the pulp, to reduce protein accumulation in subsequent sizing. There is no link whatsoever between the use of such enzymes acting on non-starch polysaccharides such as xylanase in pulping and for treating flour before it is brought into contact with the pulp in subsequent paper sizing.

It is found that the build-up of protein-containing agglomerates in surface sizing is especially reduced to levels, which are acceptable for industrial processing, if, of all available flours, rye flour is provided to the paper size.

Although not wishing to be bound by any theory, it is the inventors' belief that this effect may be ascribed to the little and/or specific protein content of rye flour. Rye flour contains significantly larger amounts of water-soluble albumins and globulins, and smaller amounts of alcohol-soluble prolamine, compared to the more abundant wheat and corn flour. Furthermore, the rye flour proteins have a lower average molecular weight and tend to cross-link to a lesser degree. All of this lead to the observation that the agglomeration behaviour of rye differs from that of abundantly used flours, such as wheat flour, in that it yields smaller protein-containing agglomerates.

More generally, it is an object of the invention to use flour as a source of starch, either modified or unmodified, without separating the starch from other flour components, in particular the protein content of the flour.

DETAILED DESCRIPTION OF THE INVENTION

The invention thus pertains to a process for manufacturing a cellulose fibre matrix product, such as paper or cardboard, wherein flour comprising at least a protein and starch fraction, is subjected to a degradation step, involving a treatment with protease and a non-starch polysaccharide hydrolysing enzyme, after which the flour is introduced into the fibre matrix, preferably the paper fibre matrix.

In broad terms, the invention pertains to a process involving the use of starch, wherein said starch is provided for by a flour, said flour comprising at least a protein and starch fraction, wherein said flour is subjected to a degradation step, involving a treatment with protease and a non-starch polysaccharide hydrolysing enzyme, after which the flour is introduced into the process as a source of starch without separating at least the protein content of the flour there from. The process can involve the manufacture of textiles, detergents, paints, inks, coatings, glues, bioplastics and adhesives, oil drilling, mining, building and construction, where starch is used traditionally. It is now possible to use flour as an easily accessible and economically favourable source of starch, without the need to purify the starch there from. In fact, it is found that the treated protein content of the flour even contributes positively.

Throughout the text, he term "flour" encompasses both chemically unmodified flour and flour that has been chemically modified. The flour may also be physically modified. More details are given below.

Hence, the process involves the use of protein-containing and starch-containing fractions originating from one and the same vegetable source, i.e. flour, and wherein the protein-containing fraction and the starch-containing fraction have not been separated from one another. Other components originating from the vegetable source may be present likewise, such as cell wall or non-starch polysaccharides, fibres, lipids and ash. After the enzymatic treatment the treated components of flour are jointly introduced into the paper fibre matrix in one step. The invention thus relates to a process wherein flour can be used entirely, without generating waste products, in the paper industry. The energy consumption is reduced considerably. Moreover, the choice for flour over starch is an economic one.

Flour

Flour may be derived from seeds, tubers, roots, grains or grasses. More extensibly, flour may be derived from seeds, legumes, nuts, and grains, such as beans, kidney beans, soybeans, lentils, (yellow, green, wrinkled) pea, chickpea, wheat, buckwheat, triticale, sorghum, amaranth grain, corn, sago, barley, oat and rice. Additionally, flour may be derived from grasses, roots or tubers, such as potatoes, sweet potato, quinoa, arrow root and cassaya. The flour may be derived from amylose-rich (amylo) or amylopectin-rich (waxy) plant resources. Also products referred to as meal, grits, milled or crushed cereal grains or more coarsely grounded flours, fall within the scope of this patent.

However, in the process of the present invention it is especially preferred that the flour comprises a flour with a protein content of 2-20 wt %, based on dry matter, in particular a cereal flour, preferably rye flour.

To improve the processibility and functionality of the flours, the flours may be pre-treated by techniques well-known to the flour processing and-/or milling industry such as (re-)milling, air-classification and heat-treatments or combinations thereof. Additionally, chemically modified flour or flour derivatives may be used. Preferably flours are used which are not or slightly chemically modified, preferably phosphorylated. In one embodiment, flour is applied being chemically modified having a degree of modification of less than 10%, more preferably less than 5%, wherein the percentage is based on the maximum degree of substitution for that type of modification.

Since the protein fraction of the employed flour may take over the function of a part of the conventionally required starch in the ultimate paper fibre matrix, it may be advantageous to regulate the starch/protein ratio in the paper sizing method of the invention by the addition of materials having different protein content, especially using other flours, especially those mentioned above. However, in terms of industrial processibility, results greatly improve with an increased rye flour content, having a reduced protein fraction. Therefore, it is preferred that the flour employed in the present process comprises at least 60 wt %, preferably at least 80 wt % rye flour, based on the total flour content provided to the degradation step; the remainder being one of the above flours, especially wheat and/or corn flour. Best results are obtained if the flour is completely formed from rye flour.

The use of flour in the process of the invention may be recognised by increased protein contents in the cellulose fibre matrix e.g. tissue, non-woven, paper and cardboard. The use of rye flour in the process of the invention may be recognised by increased levels of soluble proteins like albumin and globulin, and decreased levels of insoluble proteins like prolamin and glutenin in the ultimate (paper) fibre matrix. Since the rye flour protein fraction, in contrary to e.g. wheat flour, has increased water solubility and affinity with paper, the uptake of proteins in to the paper is enhanced, and agglomeration reduced. Rye flour typically contains 5-15 wt % proteinaceous matter, based on its solids content.

Flour is used in amounts of preferably 0.1-15 wt %, more preferably 1-8 wt %, calculated on the dry mass of the final cellulose or paper fibre matrix.

Paper, or other cellulose fibre matrix materials, such as card-board, fibre-board, tissues, non-wovens and textiles, produced using the process of the present invention preferably contains at least 0.1 wt %, more preferably 0.3-8 wt % starch material; the proteinaceous content of the (paper) fibre matrix is preferably between 0.05 and 2.4 wt %, calculated on the dry solids content. These starch and protein materials may be present in the form of degradation products such as starch hydrolysates and non-starch polysaccharide hydrolysates, and protein hydrolysates, and can be recognised as such in the ultimate paper product.

Protease

As part of the (molecular) degradation or hydrolysis of its components, the flour is subjected to a protease treatment. It typically involves 100-2000 ppm protease, calculated on the total dry flour content. The protease treatment is essential in solubilizing the protein content and preventing the later formation of protein agglomeration, sometimes referred to as deposition, lumping, dough formation or foam formation. The skilled person knows which protease preparations are most suitable for use in paper making. The present invention is not restricted to the origin of the enzymes used, and encompasses both endo- and exo-proteases. Therefore, suitable proteases can be found in the classes of proteinases (or endopeptidases) and peptidases or exopeptidases. Both fungal and bacterial proteases are useful. Good examples, of commercially available protein hydrolysing enzymes useful in the present invention are, for instance, Neutrase, Alcalase, Flavourzyme (Novo Nordisk) or Fromase TM, Brewers and Pescalase (DSM-Gist Brocades), Maxatase TM, Promod 31 (Biocatalysts) and Protex (Genencor).

The protein may be pre-treated or post-treated in an optional reduction step to additionally cleave some of the disulphide bonds using, for instance, an acidic reducing agent such as alkali metal sulphites, alkali metal bisulphites, alkali metal metabisulphites, sulphur dioxide, mercaptan and cysteine.

Non-Starch Polysaccharide (NSP) Hydrolysing Enzyme

The flour components are further subjected to a treatment with a cell-wall or non-starch polysaccharide (NSP) hydrolysing enzyme. Examples of non-starch polysaccharide hydrolysing enzymes can originate from various sources, which can be either bacterial or fungal based. It is preferred that the non-starch polysaccharide hydrolysing enzyme is an O-glycosyl hydrolyase of the EC class 3.2.1, more preferably a hemi-cellulase or a cellulase, or a combination thereof. The amount of NSP hydrolysing enzyme is typically about 10-2500 ppm more preferably 50-1500 ppm, based on the total dry flour content. Hemi-cellulase for instance comprises arabinase, xylase, mannase, arabinoxylanases, xylosidase, galactomannase, pectinase, (1,3-or 1,4-)-β-glucanase and (endo)-xylanase, or combinations thereof, such as zymolyase. In a preferred embodiment, hemi-cellulase comprises galactomannase, pectinase, β-glucanase and xylanase.

In a preferred embodiment the NSP hydrolysing enzyme preparation comprises xylanase, in order to solubilize the hemicellulose also present in flour, and which participates in subsequent cross-linking and agglomeration. Xylanase preparations derived from either fungi or bacteria are useful for the purpose of the invention. However, recombinant or synthetic xylanases would also be useful in the process of the invention. Xylanase preparations comprising an endo-xylanase are preferred. The particular micro-organism used as a source of xylanase does not form a part of the present invention. Many of such micro-organisms are known in the art, as described in WO-A-91/05908, in particular pages 9 and 10 thereof. In contrast to the teachings of WO-A-91/05908, it is preferred in the process of the invention to use a strain that produces xylanase and cellulase. The NSP hydrolysing enzymes useful in the present invention may be commercially available, for example, by Celluclast (Novozymes), Econase HC400 (Econase Co.), Pentopan Mono BG (Novozymes) Ceremix (Novozymes), Cellulase AC (Solvay Enzymes), Filtrase (DSM), and Optimash (Genencor). A preferred suitable candidate is an enzyme preparation commercially available by the name of Multifect from Genencor. Multifect is in fact often addressed as a mixture of a xylanase and a cellulase.

Most preferably, the NSP hydrolysing enzyme preparation exhibits both xylanase and cellulase activity.

Like the protease treatment, the treatment with the NSP hydrolysing enzyme may be performed at any stage prior to the introduction of the flour in to the (paper, cellulose) fibre matrix.

Improved functionality can be obtained using additionally other polysaccharide and-or protein modifying enzymes, such as glucose oxidase, hexose oxidases, pyranose oxidase, endotransglycosylase, transglutaminases, dehydrogenases, peroxidase, oxidoreductase, laccase, glutathione oxidase, L-amino acid oxidase and lysyl oxidase alone or in combination, or using lipid modifying enzymes such as lipases and glycolipases.

Persulfate, $H_2O_2$

It is preferred that the degradation step further comprises a step to solubilize the starch content of the flour. Such treatments are widely known for native starch and may equally well be applied here. It may be a (thermo-)chemical or physico-chemical treatment, for instance using a persulfate, such as ammonium persulfate (APS), at elevated or high temperature conditions.

However, chemical means can also be employed to reduce the molecular weight of the starch and render it more soluble. The $H_2O_2$ oxidation taught in U.S. Pat. No. 3,859,108 is an example of such a suitable chemical treatment. Other examples of suitable treatments include treatment with organic peroxides and organic persulphates, hypochlorite and periodate oxidation, and thermochemical treatments involving alkali, (reducing) acids, bromates, permanganates, peracids, N-dioxide, and Cr-acid. Oxidation or oxidative degradation may be carried out in the presence of metal catalysts, such as vanadium, ferrous or copper ions. Oxidation with $H_2O_2$ can also be facilitated with a catalyst based on an organic acid or acid anhydride Best results are obtained using the aforementioned APS treatment. Such treatment is performed in the presence of acid, for instance acetic acid or citric acid. The APS treatment may be performed at a temperature of about 85-100° C., preferably at boiling temperature, and preferably for a short period of 5-30 minutes. Alternatively, milder conditions may be selected, such as 50-70° C. at 20-60 minutes, or starch degradation may be achieved using jet-cooking conditions such as 120-150° C. Typically 0.05-0.6 wt % APS may be used, calculated on the total dry flour content. In addition to the desired starch degradation, this treatment may provide processing of the protein to some extent.

Amylase

In addition or alternatively, starch degradation may also be achieved enzymatically, using one or more starch-hydrolysing enzymes. Typical examples of suitable starch hydrolysing enzymes are glucoamylase, α-amylase, β-amylase, pullulanase, isoamylase, glucosidase, glucanase, glucose isomerase and glucotransferase, and combinations thereof. Enzymes may be fungal or bacterial based. Commercial available enzymes are, for instance, Dextrozyme, BAN, Termamyl (Novo Nordisk), and GC250 E, Optisize (Genencor), and Filtrase, Mats, Mycolase LV, Dexlo CL (DSM) and Bioamylase BBA, Amylo 300, Bioglucanase TX (Kerry Bioscience). Preferably amylase is used. Synergistic results are observed in case of a treatment with both APS and amylase.

Furthermore, the above measures taken to establish molecular mass reduction or solubilisation of starch, protein or NSP may be combined with additional high-shear, gamma-irradiation and ultrasound treatments.

To establish additional protein degradation, use can be made of thiol redox proteins for reducing protein intramolecular disulphide bonds, cysteine reduction. Synergistic effects, in for instance starch and protein molecular mass reductions and improved functionality, may be observed using combinations of these techniques.

One or more of the foregoing enzymatic, physical and (thermo)chemical steps may conveniently be performed simultaneously. There is no significant effect of the order in which the different solubilization steps are performed. Still, it is preferred to combine at least the protease and NSP hydrolysing enzyme treatment, since the conditions at which these are optimally performed resemble one another. The enzymatic treatment(s) may precede, coincide with or follow the (thermo)chemical and/or enzymatic starch degradation step using amylase. However, a simultaneous protein and starch treatment may be hindered by different optimal conditions, especially in case starch degradation involves a chemical treatment at high temperature. In such case, it is preferred to first subject the flour to a protease and NSP hydrolysing enzyme treatment, where after the flour is subjected to a (further) starch degradation step(s) and the temperature is raised.

Processing times may be reduced by at least combining the enzymatic treatment with protease and non-starch polysaccharide hydrolysing enzymes.

Since any of the foregoing enzymatic and chemical treatments are generally known in the paper making industry, albeit, in case of a xylanase treatment, for other reasons and in a different stage of paper production, determining the optimal conditions for each and everyone of these steps is considered to fall within the ambit of the skilled person's knowledge.

In principle, the protein degradation conditions may be selected such that the protein degrades into small fragments, even down to the level of amino acids. Then, the interfering properties caused by the protein component are completely eliminated and only the starch component is used effectively. However, it is preferred to only partially degrade the proteins, in order to maintain the aforementioned advantages of proteins replacing starch in the paper fibre matrix. After all, if there is no proteinaceous material contributing to the paper fibre matrix, it would disadvantageously require additional starch material to compensate for the loss.

An important factor in determining the extent of degradation is the viscosity of the treated flour suspension. As a skilled person knows, for use in paper manufacture, especially on size press, a product dissolved in water and having a Brookfield viscosity of less than about 100 cP is required. Hence, in the field of size-pressing, the treated flour should at least have a viscosity in the above-mentioned range. However, for applications other than size press, it is preferred that the product dissolved in water has a Brookfield viscosity of 1-1000 cP, in particular 10-100 cP. In any case, it is especially preferred that the viscosity of a treated 10 wt % flour suspension is between 30 and 80 cP at 70-80° C., corresponding to viscosity levels obtained using native starch solutions. The enzymatic and/or (thermo)chemical degradation steps may be adapted to regulate the viscosity of the flour suspension. Incubation time, temperature, pH and concentrations of enzymes and chemicals are important factors therein.

The treatment of the flour can be performed batch-wise or continuously, for instance using typical enzyme or chemical reactors. Examples are batch-reactors, List reactors, Loedige blender/mixers, high-pressure and high-shear reactors, jet-cookers, extruders or any other method well-known to industry suitable for wet or semi-dry processing of polymers.

In another embodiment, the flour may be (wet or dry) premixed with the enzymes, protease and NSP hydrolysing enzymes and/or starch hydrolysing enzymes, e.g. amylase. The preparation of the (dry) premixes can be done using any of the conventional mixing devices such as an extruder and Loedige blender or at various stages during the flour preparation process, e.g. milling and/or air-classification. The final water content of the premixed product can adjusted by an additional drying step, which can be done using any of the well-known drying methods such as hot air drying, infrared drying, fluid-bed drying, spray drying, or using rotary, tubular and drum dryers or drum flakers. The premixed flour-enzyme product reduces some of the processing and mixing steps needed at the production sites e.g. paper and cardboard paper size. The effect of the flour on the stiffness and strength properties of the paper and cardboard product is measurable through SCT values ("Shortspan Compression Test") and Burst, respectively. These SCT values and the burst factor can be determined according to standardised requirements (e.g. DIN 54518 and ISO 2758, respectively).

The SCT value is the maximum compression force per width unit that a test strip can undergo under defined conditions until this strip becomes upset. It is normally expressed in kN/m.

The burst factor is determined from a burst pressure measurement. The burst pressure is the pressure exerted on a piece of paper at the moment when the paper cracks. The burst factor (expressed in kPa) is equal to the burst pressure multiplied by 100 divided by the basic weight (g/m$^2$).

The invention further relates to a process for manufacturing paper or cardboard, comprising at least a step wherein proteins and starch, i.e. the product as it is recovered from flour as an unseparated vegetable protein/starch mixture, after being subjected to the above-mentioned treatment(s), are jointly introduced into the paper fibre matrix.

The process of the present invention may beneficially be applied in the production of paper based on recirculated or recycled material, but also in respect of solid cardboard and various types of paper based on "virgin fibre". In the paper thus obtained the protein and starch fraction of the flour are penetrated in to the paper fibre mass; there is no clear sharply delimited layers of protein and starch masses and paper fibre masses present, but rather a distribution of starch, protein and fibre domains pressed together. Dependent on the actual viscosity of the flour size suspension, different penetration depths of the protein and starch fractions in to the paper matrix are reached: a viscosity decrease yields a larger penetration depth. The process distinguishes from all kinds of prior art paper application methods incorporating some kind of protein coating in that it does not result in some kind of continuous coating layer on top.

In a preferred embodiment of the process according to the invention, protein-starch mixtures are introduced into the paper by means of a size press treatment. During size press treatment a solution or suspension containing the protein-starch mixture to be used is pressed into the paper by means of rolling. The size press treatment can be carried out single-sided on the top or bottom side of the paper web, as well as double-sided.

It is another objective of the invention to provide a ready-to-use, readily dispersing, (cold-)swelling and/or dissolving flour-containing composition suitable for industrial non-food applications, wherein the flour has been treated with a protease and an NSP hydrolysing enzyme in accordance with the instructions provided above. The flour thus obtained may be used in the production of non-food applications, as a source of starch. The flour may be provided to the process in partly or partially hydrolysed form, in a dry or semi-dry state, thus making it suitable for storage and transport and for further processing.

Hence, the invention also pertains to a composition containing (a) flour, comprising a protein and starch fraction, (b) a protease and (c) an NSP-hydrolysing enzyme. Alternatively, the different constituents may be provided in the form of a kit-of-parts.

In addition to above-reported steps of treating the starch and protein fractions of the flour, the flour thus obtained may be subjected to a drying step, to obtain a powder, for instance using an extruder. The flour may be dried, for example in a ring dryer or any other standard dryer, such as those used for drying starch. The powder is preferably dried to a water content where it is transformed into a free-flowing state, with a water content of less then 20%, preferably less than 15%, preferably less than 10%, most preferably less than 5% (on the basis of dry solids weight). Additionally, enzymes can be inactivated by a separate heating step or as integral part of a high-temperature drying step. These products can be therefore transported as a solid reducing transport costs. By the drying step a product is obtained with good physical, chemical and bacteriological (shelf-life) stability, suitable for storing.

It is preferred that protease and NSP hydrolysing enzyme are present in an amount of 10-2500 ppm or more preferably 50-1500 ppm, based on the dry weight of the composition. 0-10 wt %, more preferably 0.2-5 wt % of additives may be present, and the remainder of the dry content is preferably formed from flour.

Examples of such additives are described below. For instance, the (dried) flour-containing compositions may include from about 0-2.5%, or more preferably 0.05-0.5%, by weight of a defoamer (such as a silicone and polymeric defoamers as Struktol, L61 Pluronic (from BASF) or DSP emulsions and MP-10 (Dow Corning), based upon the total solid weight. The flour-derived compositions may contain also other processing aids, such as rheology modifiers and-/or, free flowing, anti-caking and dispersing agents from about 0-5%, or more preferably 0.05-1% of the dry matter content. The flour-derived compositions may include also other ingredients to improve the functional or visual properties such as colouring agents, colour retention aids, stabilisers, thickeners, emulsifiers, antioxidants, preservatives, bulking agents, humectants, acids and acidity regulators, from about 0.05-5%, or more preferably 0.2-0.5%.

The dried flour-containing material is readily reconstituted in water. It can be directly used as cold-water swelling or cold-water dissolving ingredients, in various non-food applications, where no heating facilities are present during processing. In other embodiments a pre-heating or cooking step, during dissolving or dispersing, can be applied to increase or improve dispersing or dissolving properties of the treated flours before using in a non-food product. Depending on the degree of protease and/or NSP enzyme treatments and degree of starch degradation and/or melting or gelatinization, products are obtained with differences in viscosity suitable for various non-food applications.

Typical non-food applications of the flour-derived products are found as replacement of starches in traditional starch industrial, non-food applications. Examples are paper and cardboard, glues and adhesives, oil drilling, mining, textile, paint, ink and coating, detergent, bioplastic, building and construction.

The dried enzyme-treated flour-derived products after reconstituting, dispersing or dissolving, may be used as a glue or adhesive composition, for example in the production of adhesive tapes such as gummed tape manufacture and in other industrial uses requiring adhesive properties. In particular those flour-derived products which have, upon release in reasonable amounts of water, have a viscosity from about 1 and about 100 cPs are suitable.

In accordance with another aspect of the invention, the flour-derived products are suited for providing a fibreboard, such as plasterboard or composite board or particle board, comprising the incorporation of the enzyme-treated flour-derived products after reconstituting, dispersing or dissolving, within the board. Especially flour-based products with a viscosity in the range of 1-1000 cP, or preferably 1-100 cP, are suitable.

Products with a relatively high zero-shear-rate viscosity and a shear-thinning viscosity profile are suitable as thickeners in for instance oil drilling and mining, and building and construction applications. Preferably, these flour-derived products, being less salt sensitive then polyelectrolyte-based alternatives, can be useful in high salt (brine) applications, for instance for fluid-loss control.

EXAMPLES

Example 1

Preparation of Rye Flour Suspension

A 32 wt % suspension of rye flour (Meneba, Rotterdam, the Netherlands) was prepared, to which, based on the dry flour content, 1000 ppm Protease (Protex 14L-Genencor) and 500 ppm Xylanase (Multifect CX 10L-Genencor) was added. Multifect is referred to as a cellulase in the data sheet. After 30 minutes at 50° C. ammonium persulfate (0.4 wt % on starch basis) was added, and the dispersion was heated to its boiling point. After cooking, the suspension was diluted with warm water until 7 wt % of solids.

The viscosity of the flower suspension was measured using a Brookfield viscometer at 70° C. The results are listed in table 1.

With a size press (Type SP by Mathis, Oberhasli-Zürich (Switzerland)) the flower suspension was pressed into paper (140 g/m$^2$; testliner, 160×100 mm), with a yield of about 3 g/m$^2$. The paper was treated 3 times at a pressure of 3 bar and at a rate of 30 m/min. After the treatment the paper was dried for 1 minute at 90° C. and conditioned (1 day at 23° C. and 55% RH). The paper was characterised in terms of SCT and Burst, using Tappi T 826 and Tappi T 807 methods, respectively. In Tappi T 826, a paper specimen, 15 mm wide, is clamped in two clamps, 0.7 mm apart. The clamps are forced towards each other until compressive failure. The SCT value corresponds to the maximum force causing failure. In Tappi T 807, a paper specimen, held between annular clamps, is subjected to an increasing pressure by a rubber diaphragm, which is expanded by hydraulic pressure at a controlled rate, until the paper specimen ruptures. The maximum pressure reading up to the rupture point is recorded as the bursting strength. The results are presented in table 1, in terms of relative change compared to a blank Comparative Example I Effect of Choice of Flour Example 1 was repeated for wheat starch and wheat flour (Meneba, Rotterdam, the Netherlands). The results in terms of viscosity, SCT and Burst are also presented in table 1.

Table 1 shows that it is possible with rye flour and wheat flour after treatment with protease and xylanase and APS to arrive at paper strength properties comparable to conventional wheat starch.

TABLE 1

Paper strength properties obtained with wheat flour and rye flour

| | Viscosity (cP) | SCT blank/product at 5 g/m² (kN/m) | Burst increase* At 5 g/m² (kPa) |
|---|---|---|---|
| wheat starch | 33 | 0.80 | 33 |
| rye flour | 57 | 0.79 | 26 |
| wheat flour | 35 | 0.82 | 26 |

*Burst increase = 100 * (Burst product − burst blank)/burst blank

Example 2

Effect of Protease and Xylanase Treatment

Example 1 was repeated, leaving out the xylanase treatment. Paper was produced in accordance with the conditions given in example 1. The results of an analysis of the protein content of the flour suspension before and after use in paper sizing are presented in table 2. The results are compared to those for conventional starch, together with those for the xylanase-treated flour-sized paper prepared in example 1.

The results show that the combination of rye flour and the enzymatic treatment with xylanase is a favourable one, since—like for conventional starch treatment—no protein accumulation in paper surface sizing is observed.

TABLE 2

Effect of protease and xylanase on protein accumulation

| | Dry solids (%) | | Protein content (wt % of dry solids) | |
|---|---|---|---|---|
| | Before | After | Before | After |
| wheat starch | 7.3 | 9.7 | 0.8 | 0.63 |
| rye flour | | | | |
| with protease + xylanase | 7.0 | 9.5 | 7.3 | 6.5 |
| with protease, without xylanase | 7.0 | 10.1 | 7.2 | 10.2 |

Comparative Example II

Effect of Protease and Xylanase on Protein Accumulation

Independently, 4 suspensions of 200 g flour in 1800 g water were prepared, 2 of which based on rye flour, and the other 2 based on wheat flour.
a) APS Treatment
One of the suspensions containing rye flour and another one containing wheat flour were cooked in a water bath of 97° C. for 30 minutes. During cooking, APS was dosed to achieve a viscosity of 30-60 cP at 75° C. A few drops of Struktol 2022 antifoaming agent were added.
b) APS Treatment and Enzymatic Treatment with Xylanase/Cellulase and Protease
Independently, to a rye flour and wheat flour suspension 500 ppm xylanase/cellulase (Multifect CX 10L-Genencor) and 1000 ppm Protease (Protex 14L-Genencor) were added. These numbers were based on the total dry flour content. In all cases the flour concentration was 10 wt % of the total suspension.

The flour suspensions were first treated enzymatically in a water bath at 55° C. for 30 minutes, then followed by cooking at 97° C. for another 30 minutes. During cooking APS was dosed to achieve the desired viscosity. A few drops of Struktol 2022 antifoaming agent were added.

The 4 suspensions A and B were tested using a size press. The cooked solutions were transferred to a laboratory size press (Einlehner), where during 15 minutes paper with width of 100 mm (100 g/m²) was fed continuously at a rate of 30 m/min through a size press. At the start and the end of the test the flour suspension was sampled, dried and the nitrogen content of the dry solid content was determined using the Dumas method. The nitrogen content was converted to the protein content using a standard conversion factor. The results are shown in table 3. An increase corresponds to unwanted protein accumulation.

Table 3 shows that protein accumulation can only be prevented effectively by treating the flour suspension with xylanase/cellulase and protease.

TABLE 3

Protein content of flour suspensions before and after paper sizing

| | Time (min) | Protein content (% of dry solids) | Protein accumulation (%) |
|---|---|---|---|
| Wheat starch | 0 | 0.6 | |
| | 10 | 0.8 | +45 |
| rye flour (A) | 0 | 8.5 | |
| | 15 | 14.4 | +70 |
| rye flour (B) | 0 | 7.8 | |
| | 15 | 7.76 | −2.6 |
| Wheat flour (A) | 0 | 10.6 | |
| | 15 | 22.1 | +109 |
| Wheat flour (B) | 0 | 10.0 | |
| | 15 | 11.0 | +10 |

Table 4 shows the effect of the amount of protease on wheat flour (B):

TABLE 4 effect of amount of protease on wheat flour

| Protease doses (ppm) | Time (min) | Protein content (% of dry solids) | Protein accumulation (%) |
|---|---|---|---|
| 500 | 0 | 10.4 | |
| | 15 | 13.3 | +28 |
| 1000 | 0 | 10.0 | |
| | 15 | 11.0 | +10 |
| 2000 | 0 | 10.2 | |
| | 15 | 10.9 | +7 |

The invention claimed is:

1. A process for manufacturing paper or cardboard, comprising:
 providing flour comprising a protein fraction and a starch fraction, wherein the flour comprises at least 60 wt % of rye flour, calculated on the total flour content,
 subjecting the flour to a degradation step comprising treating the flour with a protease and a non-starch polysaccharide (NSP) hydrolysing enzyme, and
 introducing the degraded flour into a paper fibre matrix.
2. The process according to claim 1, wherein said NSP hydrolysing enzyme is a hemi-cellulase or a cellulase.

3. The process according to claim 2, wherein said hemi-cellulase is xylanase.

4. The process according to claim 1, wherein said flour comprises flour that originates from seeds, tubers, roots, grains or grasses.

5. The process according to claim 1, wherein said flour consists essentially of rye flour.

6. The process according to claim 1, wherein said degradation step further comprises at least one of thermochemically treating or physico-chemically treating the flour.

7. The process according to claim 6, comprising at least one of thermochemically treating or physico-chemically treating the flour with a persulfate.

8. The process according to claim 7, wherein said degradation step further comprises treating the flour with a starch-hydrolysing enzyme.

9. The process according to claim 1, wherein said degraded flour is introduced into said paper fibre matrix by means of a size press treatment.

10. The process according to claim 1, wherein said flour is physically and/or chemically modified.

11. The process according to claim 7, wherein the persulfate is ammonium persulfate (APS).

12. The process according to claim 8, wherein the starch-hydrolysing enzyme is amylase.

13. A process for manufacturing paper or cardboard, comprising:
providing flour comprising a protein fraction and a starch fraction;
subjecting the flour to a degradation step comprising:
treating the flour with a protease and a non-starch polysaccharide (NSP) hydrolysing enzyme, and
at least one of thermochemically treating or physico-chemically treating the flour with a persulfate; and
introducing the degraded flour into a paper fibre matrix.

14. The process according to claim 13, wherein the NSP hydrolysing enzyme is a hemi-cellulase or a cellulase.

15. The process according to claim 14, wherein the hemi-cellulase is xylanase.

16. The process according to claim 13, wherein the flour comprises flour that originates from seeds, tubers, roots, grains or grasses.

17. The process according to claim 13, wherein the flour consists essentially of rye flour.

18. The process according to claim 13, wherein the degradation step further comprises treating the flour with a starch-hydrolysing enzyme.

19. The process according to claim 13, wherein the degraded flour is introduced into the paper fibre matrix by means of a size press treatment.

20. The process according to claim 13, wherein the flour is physically and/or chemically modified.

21. The process according to claim 13, wherein the persulfate is ammonium persulfate (APS).

22. The process according to claim 18, wherein the starch-hydrolysing enzyme is amylase.

* * * * *